United States Patent Office
3,206,280
Patented Sept. 14, 1965

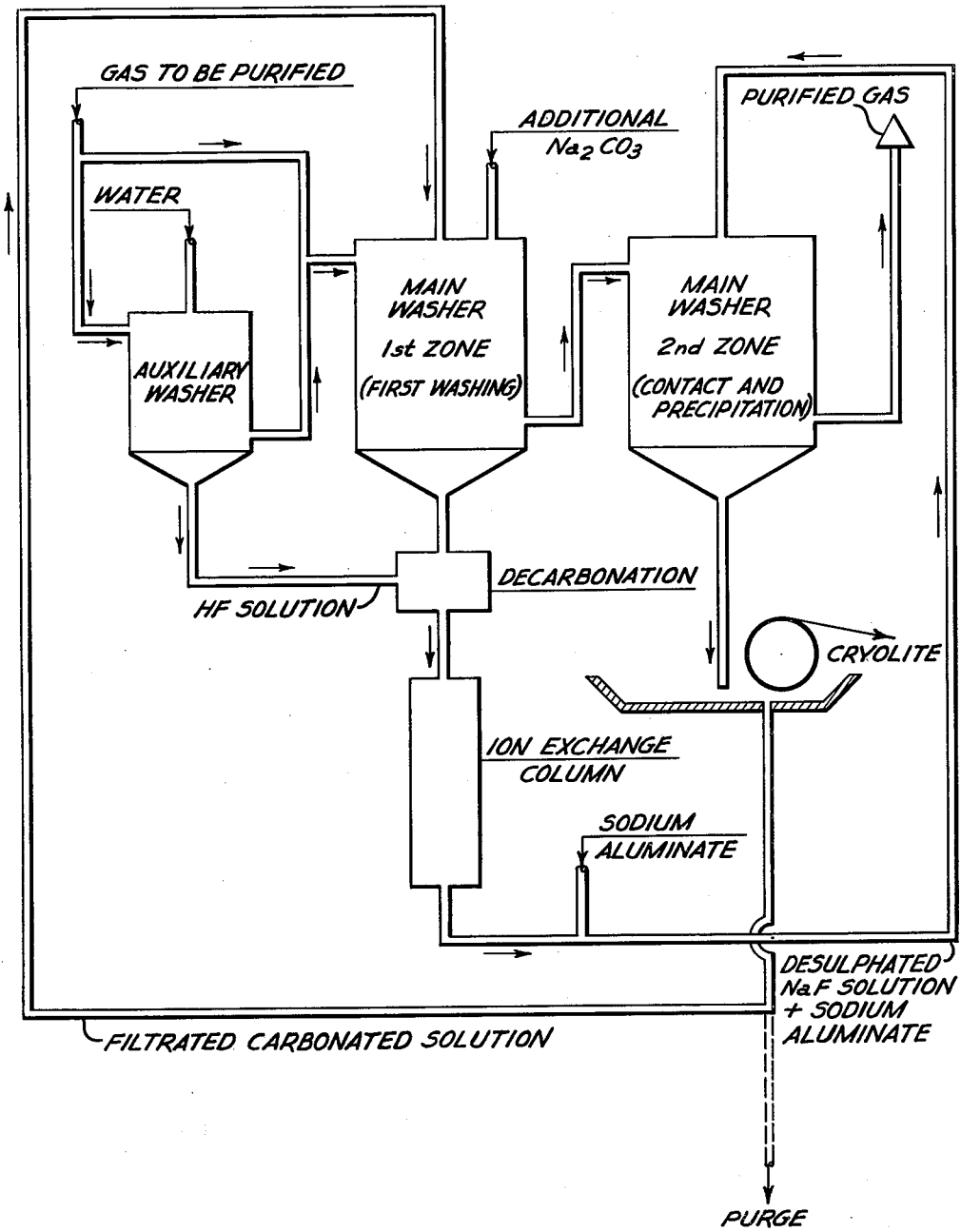

3,206,280
PROCESS OF RECOVERING, IN THE FORM OF CRYOLITE, THE FLUORINE FROM GASES CONTAINING SAME
Marcel Armand and Jean Berthoux, Albertville, France, assignors to Societe d'Electro-Chimie d'Electro-Metallurgie et des Acieries Electriques d'Ugine, Paris, France, a corporation of France
Filed July 9, 1963, Ser. No. 290,294
Claims priority, application France, July 4, 1960, 831,896
8 Claims. (Cl. 23—88)

This application is a continuation-in-part of our application Serial No. 118,020, filed June 19, 1961, now abandoned and relating to "Process of Recovering Fluorine from Gases Containing the Same."

The production of aluminium by electrolysis of molten fluorinated baths is accompanied by an escape of residuary gas containing a rather substantial content of carbon dioxide and also fluorine in the form of hydrofluoric acid.

Aside from the necessity of purifying such gases before discharging them into the atmosphere, there have often been attempts to recover from them the fluorine which is an element of value. For this recovery, it has been proposed, for example, to transform the fluorine into cryolite or any other fluoride suitable for industrial use.

Thus, according to a known method, the gases are washed with water. The hydrofluoric acid solution thus obtained is then reacted with a solution containing aluminum and sodium to obtain cryolite. But this method presents the drawback of necessitating an installation built of acid-solution-proof materials. Besides, its purification yield is hardly more than 90%. On this account, if it is desired to eliminate the portions of fluorine which escape this acid washing, a second gas purification system must be provided, for instance a washing with a basic solution.

According to other known methods, the gases are washed with a sodium carbonate or caustic soda lye in excess. A more or less carbonated sodium fluoride solution is thus formed, from which it is possible to precipitate cryolite in an independent apparatus by adding sodium aluminate, and, if need be, by bubbling carbon dioxide into it. But this method presents the disadvantage of giving a cryolite which settles slowly and is very hard to filter.

The present invention compensates for the above drawbacks. It offers the advantage of precipitation of a product which settles quickly and filters without any difficulty. It is generally applied to gaseous mixtures containing $CO_2$ and soluble derivatives of fluorine, whatever the origin of the mixtures.

It relates to a method which recovers, in the form of cryolite, the fluorine contained in any gaseous mixture which comprises volatile fluorine compounds and carbon dioxide, especially the fluorine contained in the gas mixture issuing from electrolysis cells of the fluorinated molten baths used for the production of aluminum. The method comprises subjecting this gas mixture to a first washing made with an initially alkaline solution so as to leave in it most of the gaseous carbon dioxide, then subjecting the resulting washing solution to a treatment comprising its decarbonation and the addition of a sodium aluminate solution, and using the carbon dioxide of the gases which have been subjected to the first washing to effect precipitation of cryolite from the solution resulting from the first washing.

This process comprises the following steps:
(a) A first washing of gases previously dedusted, leaving in these gases most of the carbon dioxide which they contain; this first washing is effected by introducing a solution of carbonates into the washing apparatus, said carbonates being chiefly sodium carbonate;
(b) The elimination of the dissolved or combined carbon dioxide which is in the solution resulting from this washing;
(c) The addition to the decarbonated solution of a sodium aluminate solution;
(d) The bringing into contact of the gases which have been subjected to the first washing and contain the greater part of the carbon dioxide, with the decarbonated solution to which sodium aluminate has been added, in order to subsequently precipitate cryolite;
(e) A filtering of the slurry resulting from this precipitation;
(f) If desired, the reutilization of the filtrate in order to effect the first washing of further gas to be purified.

If desired, the solution resulting from (b) may be treated in order to remove the sulphates contained therein.

These successive stages may be carried out as is explained hereinafter:
(a) The first washing may be realized by means of any known apparatus, such as a horizontal or a vertical washing tower, apparatus of the Venturi type, etc. This washing removes from the gases almost the totality of the hydrofluoric acid and it leaves in these gases most of the carbon dioxide.

This first washing is effected by introducing into the apparatus a solution containing sodium carbonate, and, contingently, sodium bicarbonate. This solution may be obtained by dissolving sodium carbonate in water, but it is preferable to use the solution issuing from the cryolite filtration of the last stage of the process, and to add to it sodium carbonate. The recycled solution contains essentially sodium carbonate, but it may also contain sodium bicarbonate. During the washing, the absorption of HF and of a small portion of $CO_2$ transforms progressively carbonate into bicarbonate. The amount of carbonates introduced depends on the pH desired in the solution resulting from the washing. This pH is near to neutrality. It is advantageous that it should be quite near to neutrality to avoid absorption of the sulphur compounds as much as possible. In fact, the pH of the solution resulting from the first washing is between 4 and 9, and preferably between 6 and 7.5.

(b) The elimination of the dissolved or combined carbon dioxide, which is in the solution resulting from the previous washing, must be practically total. A method, which is especially advantageous to that effect, consists in mixing the solution resulting from the first washing with a hydrofluoric acid solution obtained by washing with water a portion of the initial gaseous mixture, for instance in a small auxiliary washer.

(c) It is possible to use, as a sodium aluminate source, sodium aluminate solution issuing from the Bayer cycle.

(d) The bringing into contact of the gas resulting from the first washing and the treated solution can be effected according to any known method. The carbon dioxide contained in the treated gas is absorbed by the treated solution and supplies, without any new consumption, the carbonic acid necessary to obtain the medium indispensable for the precipitation of cryolite.

To carry out the first washing (a) and the bringing into contact (d), we can use advantageously two zones of the same apparatus traversed by the gases. The first stage, which secures the absorption of HF (phase a), is supplied with a carbonated solution. The second stage, which secures the bringing into contact of $CO_2$ and the treated solution (phase d), is supplied with the solution issuing from the first stage, decarbonated and mixed with a sodium aluminate solution. The cryolite precipitation is effected in that second stage.

The attached diagram illustrates the process, some optional features being shown.

The solution resulting from the first washing of the gases is freed of the contained $CO_2$ by the addition of a HF solution which is obtained by washing with water, in an auxiliary washer, a minor portion of the gases to be purified. The portion of gases thus partially purified in HF are added to the main body of gases to be purified before the introduction of the latter into the zone of the first washing. First washing of the gases and bringing into contact of the purified washing solution with the gases containing $CO_2$ may be effected in two successive zones of the same main washer. The desulphating of the solution which results from the first washing is effected, if desired, after decarbonation by contacting the solution with an ion exchanger resin. The diagram provides for a purge of a part of the filtrate separated from the cryolite and, if need be, a further introduction of sodium carbonate.

The following examples illustrate our invention:

Example 1

An aluminum cell emitted smokes; after removing the solid particles contained therein, we obtained a gas containing per cubic meter (measured at 0° C. and 760 mm. Hg), 500 mg. of fluorine in the form of hydrofluoric acid, 90 mg. of sulphur in the form of sulphurous anhydride and also 2.6% by volume of carbon dioxide.

The first washing was effected in a Venturi type apparatus, able to treat 15 cubic meters of gas per second. The alkaline solution introduced was formed of the mother-solution resulting from the cryolite filtration to which sodium carbonate was regularly added. It circulated in closed circuit with a flow of 120 cubic meters per hour. The amount of sodium carbonate added was determined in order that the pH of the solution resulting from the washing is between 7 and 7.5

The decarbonation of the resulting first washing solution was obtained by mixing this solution with the hydrofluoric acid solution resulting from the washing with water of an initial gas portion (about 1/20) in a small auxiliary washing apparatus. The so-obtained decarbonated solution, circulated continuously, had a pH of approximately 6 and contained:

F=10.95 g./liter
S=1.88 g./liter

On the other hand, we used a sodium aluminate solution containing per liter 95 g. aluminum and an amount of free or combined soda corresponding to 280 g. NaOH.

$$\text{Weight ratio:} \frac{Al_2O_3}{NaOH} = 0.655$$

This solution was added to the decarbonated washing solution, at the rate of 2.25 liters of aluminate solution per 100 liters of the decarbonated solution. After mixture, the solution was clear and no trace of precipitate appeared.

The bringing into contact of the washed gas with the thus treated solution, entailing the precipitation of cryolite, was realized outside of the washing apparatus, in a bubbler especially set up for this purpose, in which we introduced the gas coming out from the washing apparatus freed of its fluorine but still containing the greatest part of its carbon dioxide.

The obtained product was filtered on cloth under vacuum. After drying at 120° C., its analysis gave the following results for its principal elements:

| | Percent |
|---|---|
| Cryolite ($AlF_3 \cdot 3NaF$) | 80.0 |
| $AlF_3$ in excess | 2.9 |
| $Na_2SO_4$ | 6.5 |

Example 2

The gas to be washed had the same origin and composition as that mentioned in Example 1. The washing was effected in the same apparatus. Practically, the pH of the resulting solution from the washing was maintained constantly near to neutrality, between 6.5 and 7.5.

The so-obtained washing solution contained:

F=11.91 g./liter
S=1.69 g./liter

It was then reacted with an acid solution of HF in order to obtain a solution of pH 6.

The sulphur was eliminated therefrom in the state of ion-sulphate $SO_4^{--}$ by flowing the solution through an ion exchanger column containing a strong anionic resin, the Amberlite IRA 400, put in the form $OH^{--}$ by washing with a soda solution at 120 g./NaOH/liter. The exchange capacity of such a column was 2.5 m. eq./g. of resin for a passage speed of 5 cm.$^3$/cm.$^2$/min.

After passage through the column, a solution composed of:

F=12.6 g./liter
S=0.06 g./liter was obtained.

The same sodium aluminate solution as in Example 1 was used.

This solution was mixed with the above desulphated solution at the rate of 2.5 liters sodium aluminate solution per 100 liters of the desulphated solution.

The bringing into contact of the washed gas and the purified solution, entailing the precipitation of cryolite, was realized according to the method described in Example 1. The obtained product was filtered and dried at 120° C. Its analysis gaves the following results for its principal elements:

| | Percent |
|---|---|
| Cryolite ($AlF_3 \cdot 3NaF$) | 88.5 |
| $AlF_3$ in excess | 2.6 |
| $Na_2SO_4$ | 1.4 |

We claim:

1. A process for recovering, in the form of cryolite, the fluorine contained in a gas mixture comprising volatile fluorine compounds which include hydrogen fluoride and carbon dioxide gas, the process comprising washing the gas mixture with an aqueous solution containing sodium carbonate and sodium bicarbonate to remove fluorine compounds soluble in said aqueous solution from the gas mixture but to leave most of the carbon dioxide in the gas, the solution resulting from said washing having a pH between 4 and 9, substantially eliminating dissolved and combined carbon dioxide from the resulting washing solution to form a decarbonated washing solution, adding sodium aluminate to said decarbonated washing solution to form a resulting sodium aluminate solution, treating said resulting sodium aluminate solution with the carbon dioxide containing gas which has been subjected to said washing in order to precipitate cryolite and recovering said cryolite.

2. The process of claim 1 characterized by said solution resulting from said washing having a pH between 6 and 7.5.

3. A process for recovering, in the form of cryolite, the fluorine contained in a gas mixture comprising volatile fluorine compounds which include hydrogen fluoride and carbon dioxide gas, the process comprising washing the gas mixture with an aqueous solution containing sodium carbonate and sodium bicarbonate to remove fluorine compounds soluble in said aqueous solution from the gas mixture but to leave most of the carbon dioxide in the gas, regulating the amount of sodium carbonates in said aqueous solution to maintain the pH of the solution resulting from said washing between 4 and 9, substantially eliminating dissolved and combined carbon dioxide from the resulting washing solution to form a decarbonated washing solution, adding sodium aluminate to said decarbonated washing solution to form a resulting sodium aluminate solution, treating said resulting sodium aluminate solution with the carbon dioxide containing gas which has been subjected to said washing in order to precipitate cryolite and recovering said cryolite.

4. The process of claim 3 characterized by so regulating the amount of sodium carbonates in said aqueous solution that the solution resulting from said washing has a pH between 6 and 7.5.

5. A process for recovering, in the form of cryolite, the fluorine contained in a gas mixture comprising volatile fluorine compounds which include hydrogen fluoride and carbon dioxide, the process comprising washing a minor portion of the gas mixture with water to form a hydrofluoric acid solution, washing the main portion of said gas mixture and the minor portion of said gas mixture which has been previously washed with water with an aqueous solution containing sodium carbonate and sodium bicarbonate to remove fluorine compounds soluble in said aqueous solution from the gas mixture but leaving most of the carbon dioxide in the gas, said solution resulting from said latter washing having a pH between 4 and 9, substantially eliminating dissolved and combined carbon dioxide from the resulting washing solution by adding to it the hydrofluoric acid solution resulting from said washing of the minor portion of the gas mixture to form a decarbonated washing solution, adding sodium aluminate to said decarbonated washing solution to form a resulting sodium aluminate solution, treating said resulting sodium aluminate solution with the carbon dioxide containing gas which has been subjected to said latter washing in order to precipitate cryolite and recovering said cryolite.

6. The process of claim 5 characterized by said solution resulting from said latter washing having a pH between 6 and 7.5.

7. A process for recovering, in the form of cryolite, the fluorine contained in a gas mixture comprising volatile fluorine compounds which include hydrogen fluoride and carbon dioxide, the process comprising washing a minor portion of the gas mixture with water to form a hydrofluoric acid solution, washing the main portion of said gas mixture and the minor portion of said gas mixture which has been previously washed with water with an aqueous solution containing sodium carbonate and sodium bicarbonate to remove fluorine compounds soluble in said aqueous solution from the gas mixture but leaving most of the carbon dioxide in the gas, regulating the amount of sodium carbonates in said aqueous solution to maintain the pH of the solution resulting from said latter washing between 4 and 9, substantially eliminating dissolved and combined carbon dioxide from the resulting washing solution by adding to it the hydrofluoric acid solution resulting from said treatment of the minor portion of the gas mixture to form a decarbonated washing solution, adding sodium aluminate to said decarbonated washing solution to form a resulting sodium aluminate solution, treating with resulting sodium aluminate solution with the carbon dioxide containing gas which has been subjected to said latter washing in order to precipitate cryolite and recovering said cryolite.

8. The process of claim 7 characterized by so regulating the amount of sodium carbonates in said aqueous solution that the solution resulting from said latter washing has a pH between 6 and 7.5.

References Cited by the Examiner
UNITED STATES PATENTS

| | | | |
|---|---|---|---|
| 2,031,554 | 2/36 | Torchet | 23—88 |
| 2,231,309 | 2/41 | Weber | 23—88 |
| 2,943,914 | 7/60 | Moser | 23—88 |
| 3,061,411 | 10/62 | Gernes | 23—88 |
| 3,106,448 | 10/63 | Whicher et al. | 23—88 |

MAURICE A. BRINDISI, *Primary Examiner.*

UNITED STATES PATENT OFFICE
CERTIFICATE OF CORRECTION

Patent No. 3,206,280                                         September 14, 1965

Marcel Armand et al.

It is hereby certified that error appears in the above numbered patent requiring correction and that the said Letters Patent should read as corrected below.

Column 3, line 73, for "($AlF_3.3NaF$" read -- ($AlF_3.3NaF$) -- column 4, line 34, for "gaves" read -- gave --; column 6, line 20, for "with resulting" read -- said resulting --.

Signed and sealed this 5th day of April 1966.

(SEAL)
Attest:

ERNEST W. SWIDER
Attesting Officer

EDWARD J. BRENNER
Commissioner of Patents